United States Patent [19]

Kawamura et al.

[11] Patent Number: 4,652,804
[45] Date of Patent: Mar. 24, 1987

[54] ACCELERATION/DECELERATION SYSTEM FOR A NUMERICAL CONTROLLER

[75] Inventors: Hideaki Kawamura; Mitsuto Miyata, both of Hachioji; Kentaro Fujibayashi, Musashino, all of Japan

[73] Assignee: Fanuc Ltd, Minamitsuru, Japan

[21] Appl. No.: 804,650

[22] PCT Filed: Mar. 15, 1985

[86] PCT No.: PCT/JP85/00132
§ 371 Date: Nov. 18, 1985
§ 102(e) Date: Nov. 18, 1985

[87] PCT Pub. No.: WO85/04270
PCT Pub. Date: Sep. 26, 1985

[30] Foreign Application Priority Data
Mar. 21, 1984 [JP] Japan .................................. 59-53940

[51] Int. Cl.[4] .............................................. G05B 11/18
[52] U.S. Cl. .................................... 318/590; 318/573; 364/181
[58] Field of Search ............... 318/590, 591, 632, 567, 318/568, 569, 570, 573; 364/474, 167, 176, 168, 169, 170, 180, 181

Primary Examiner—William M. Shoop, Jr.
Assistant Examiner—Patrick C. Keane
Attorney, Agent, or Firm—Staas & Halsey

[57] ABSTRACT

A numerical controller of the type in which acceleration or deceleration processing is performed by an acceleration/deceleration circuit (7) prior to an interpolation by an automatic mode distributor (1); a smooth acceleration or deceleration is carried out when a distribution pulse from a manual mode distributor (2) is superimposed by an adder 3 on a distribution pulse from the automatic mode distributor (1). To achieve this, the command pulse to be superimposed is also subjected to independent acceleration or deceleration processing by an acceleration/deceleration circuit (10).

3 Claims, 22 Drawing Figures

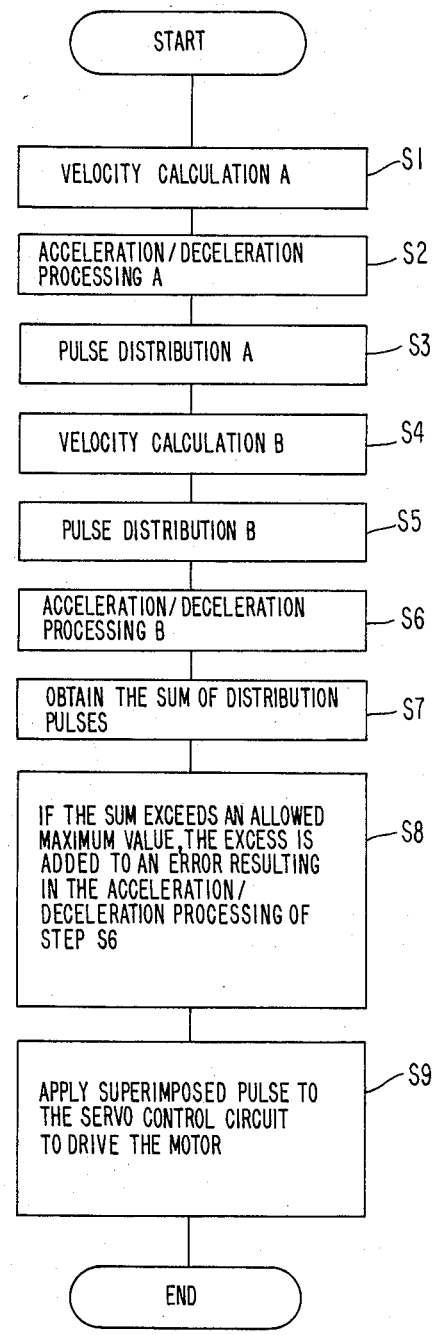

ACCELERATION/DECELERATION SYSTEM FOR A NUMERICAL CONTROLLER

BACKGROUND OF THE INVENTION

The present invention relates to an acceleration/deceleration system for a numerical controller.

A jog feed, a quick feed, a manual handle feed, a step feed and like manual operations are known means for an operator to move a machine tool to a desired position, as by a push-button manipulation during automatic running of a numerical controller which controls movements of the machine tool in the X-, Y- and Z-axis directions through commands from a tape. Also when the machine tool is driven in the same axis superimposing two or more kinds of pulse distribution commands (as in the case of effecting such a manual intervention in the automatic running of the numerical controller), it is necessary that the commands be subjected to acceleration or deceleration processing prior to their application to a servo control circuit. To meet this requirement, it is general practice in the prior art to employ an arrangement in which pulses distributed separately by automatic and manual mode distributors 1 and 2 are added together by an adder 3 and the adder output is subjected to exponential type acceleration or deceleration processing by an acceleration/deceleration circuit 4, thereafter being provided to a servo control circuit 5 to drive, for example, an X-axis motor 6, as shown in FIGS. 1 and 2. FIGS. 2A, 2B, the broken line in FIG. 2C and the solid line in FIG. 2C respectively show time vs. pulse frequency characteristics of the outputs from the automatic mode distributor 1, the manual mode distributor 2, the adder 3 and the acceleration/deceleration circuit 4.

In recent years, however, there has come into general use a system which effects the acceleration or deceleration along a commanded path in the hope of moving the tool with a minimal deviation therefrom. With this system, a tangential-direction velocity is subjected to acceleration or deceleration processing by an acceleration/deceleration circuit 7 prior to a linear or circular-arc interpolation by the automatic mode distributor 1, as depicted in FIGS. 3 and 4. Consequently, in the case of a manual intervention, the distribution pulses from the manual mode and automatic mode distributors 2 and 1 are added together by the adder 3, as shown in FIG. 3, and the superimposed distribution pulses can no more be subjected to the acceleration or deceleration processing. The reason for this is that if the output pulses from the automatic mode distributor, which have already been subjected to acceleration or deceleration processing, were further subjected to acceleration or deceleration processing, then the path of the tool would deviate from a commanded one. Therefore, assuming that the time vs. pulse frequency characteristics of the outputs from the acceleration/deceleration circuit 7, the automatic mode distributor 1 and the manual mode distributor 2 are such as shown in FIGS. 4A to 4C, respectively, the characteristic of the input pulse to the servo control circuit 5 will be as depicted in FIG. 4D, making it impossible to achieve a smooth acceleration or deceleration.

SUMMARY OF THE INVENTION

An object of the present invention is to permit a smooth acceleration or deceleration even if a command pulse for a certain axis, subjected to acceleration or deceleration processing prior to an interpolation, is superimposed on a distribution pulse for another axis.

FIG. 5 is a diagram for explaining the arrangement of this invention system. The parts corresponding to those in FIG. 3 are identified by the same reference numerals. Reference numeral 10 indicates an acceleration/deceleration circuit and 11 a clamp circuit. The present invention differs from the prior art example of FIG. 3 in that when the distribution pulse from the manual mode distributor 2 is superimposed on the command pulse subjected to the acceleration or deceleration processing by the acceleration/deceleration circuit prior to an interpolation, the command pulse from the manual mode distributor is also subjected to acceleration or deceleration processing by the acceleration/deceleration circuit 10 and then added by the adder 3 to the distribution pulse from the automatic mode distributor 1. With such an arrangement, even if the command pulse subjected to acceleration or deceleration processing prior to an interpolation is added to another distribution pulse, a smooth acceleration or deceleration can be achieved. FIGS. 6A, 6B, 6C, 6D and 6E show time vs. pulse frequency characteristics of the outputs from the acceleration/deceleration circuit 7, the automatic mode distributor 1, the manual mode distributor 2, the acceleration/deceleration circuit 10 and the input to the servo control circuit 5, respectively. As will be seen from FIG. 6, a smooth acceleration or deceleration can be attained at the input of the servo control circuit 5.

The clamp circuit 11 in FIG. 5 is to clamp the output of the adder 3 to an allowed value of the pulse frequency when the adder output exceeds the allowed limit because of the superimposition of the distribution pulse from the manual mode distributor 2 on the distribution pulse from the automatic mode distributor, and the clamp circuit 11 feeds back to the input side of the acceleration/deceleration circuit 10 the adder output exceeding the allowed limit. For example, if a distribution pulse of a high frequency, as shown in FIG. 7C, is created by the manual mode distributor 2, then the acceleration/deceleration circuit 10 will produce such an output as depicted in FIG. 7D. If the clamp circuit 11 is not provided, then an output shown in FIG. 7D is superimposed on the output of the automatic mode distributor 1, shown in FIG. 7B, supplied with the acceleration/deceleration circuit output of FIG. 7A. The resulting distribution pulse of such a characteristic as indicated by the broken line in FIG. 7E is applied to the servo control circuit 5. As a result of this, the servo control circuit 5 and the X-axis motor 6 are driven by a signal exceeding the allowed limit indicated by the one-dot chain line in FIG. 7E. With the provision of the clamp circuit 11, since the maximum pulse frequency is clamped to the allowed value, as indicated by the solid line in FIG. 7E, a bad influence on the X-axis motor is eliminated. In addition, since the distribution pulse exceeding the allowed value is returned to the acceleration/deceleration circuit 10, all the distribution pulses provided from the manual mode distributor 2 are ultimately superimposed on the distribution pulses from the automatic mode distributor 1.

In FIG. 5, the automatic mode distributor 1 is shown to produce an output for the X-axis alone, but in practice it provides distribution pulses for another axis and in order to effect the manual operation for this axis, the manual mode distributor 2, the acceleration/deceleration circuit 10, the adder 3 and the clamp circuit 11 are provided for that axis.

BRIEF DESCRIPTION OF THE DRAWINGS

FIG. 9 is a flowchart for the operation processing performed by the system of the present invention.

DETAILED DESCRIPTION OF THE PREFERRED EMBODIMENT

Figure 1:
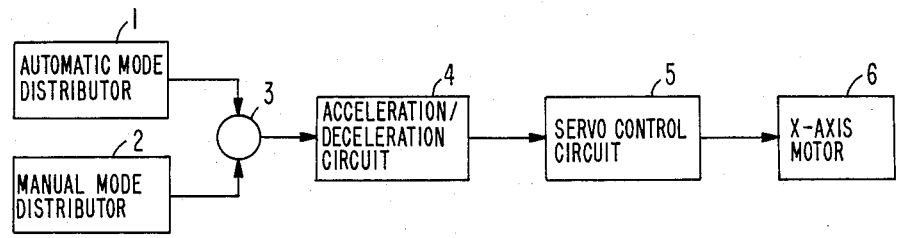
FIGS. 1 through 4D are diagrams for explaining conventional systems.
Figure 2A:
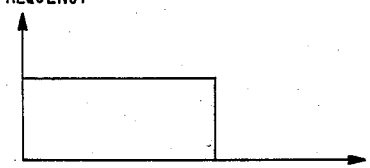
Figure 2B:
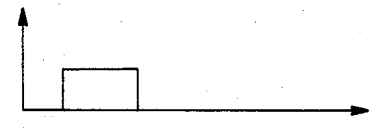
Figure 2C:
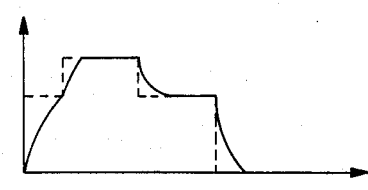
Figure 4A:
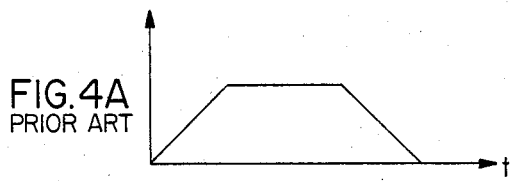
Figure 4B:
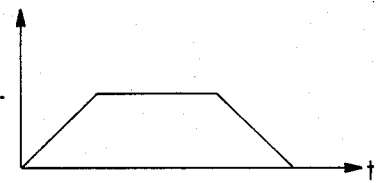
Figure 4C:
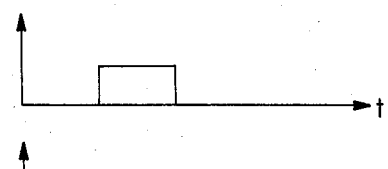
Figure 4D:
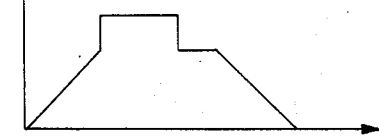
Figure 3:
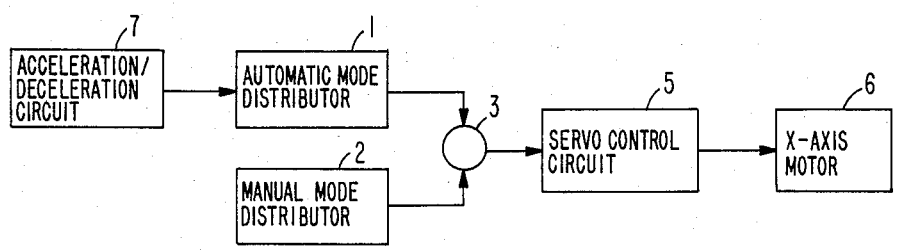
Figure 5:
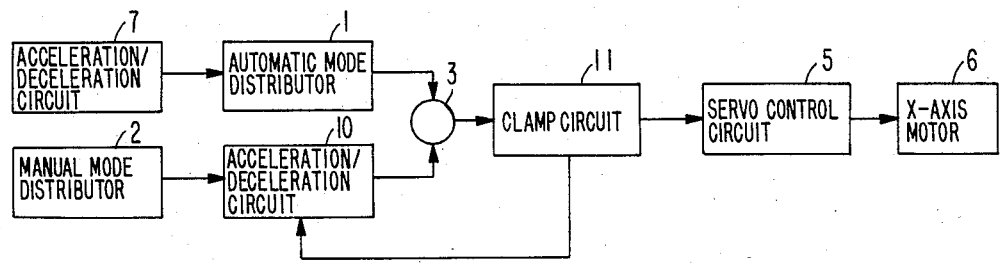
FIG. 5 is a block diagram for explaining the arrangement of the present invention.
Figure 6A:
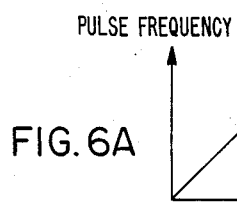
FIGS. 6A through 7E are waveform diagrams for explaining the operation of the arrangement shown in FIG. 5.
Figure 7A:
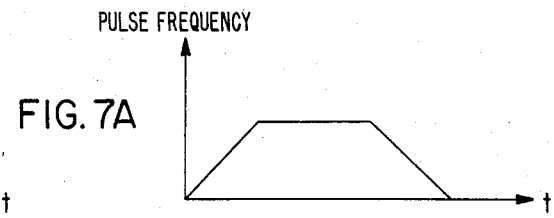
Figure 6B:
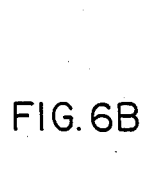
Figure 7B:
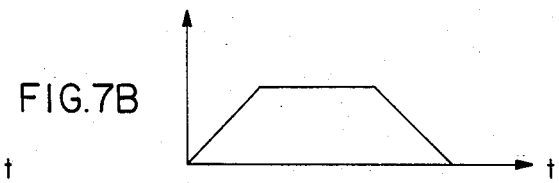
Figure 6C:
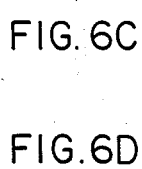
Figure 7C:
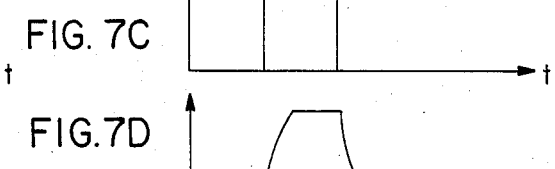
Figure 6D:
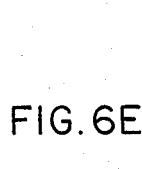
Figure 7D:
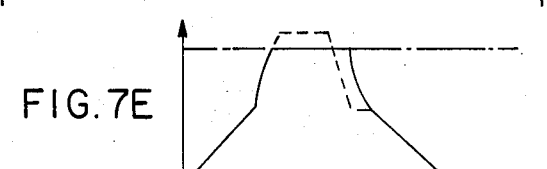
Figure 6E:
Figure 7E:
Figure 8:
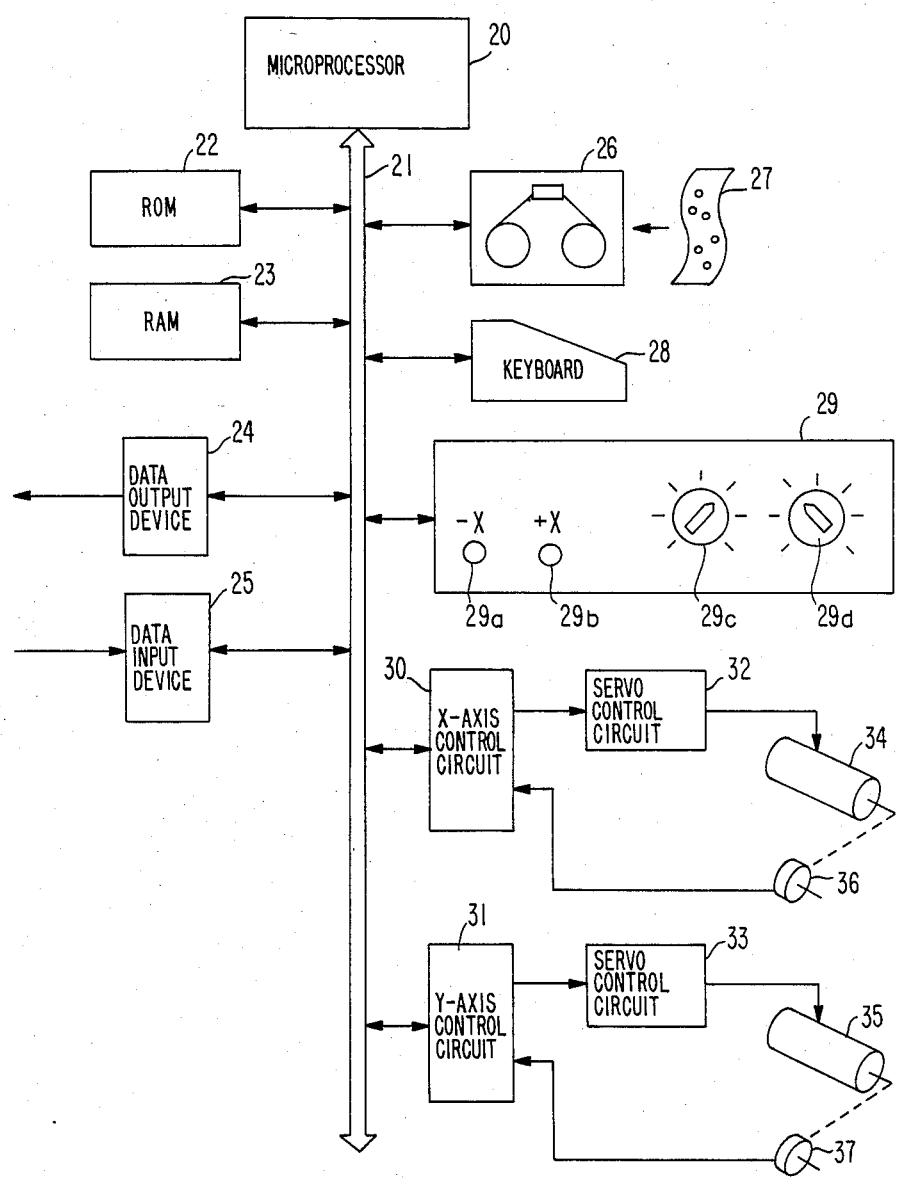
FIG. 8 is a block diagram of an embodiment of the present invention.

FIG. 8 illustrates in block form the principal part of an embodiment of the present invention. Reference numeral 20 indicates a microprocessor, 21 its bus, 22 a ROM for storing a control program or the like, 23 a RAM, 24 a data output device for sending a signal to a machine tool, 25 a data input device for receiving a signal from the machine tool, 26 a tape reader, 27 a command tape, 28 a keyboard, 29 some of the switches mounted on a control panel, 29a a −X jog feed button, 29b a +X jog feed button, 29c an override dial for determining the jog feed rate and 29d a dial for overriding a commanded velocity. In the case of a jog feed in the X-axis direction, it is necessary only to set the jog feed rate by the dial 29c and push either one of the buttons 29a and 29b according to the direction of the jog feed. Only while the button is pressed does the jog feed take place. Reference numerals 30 and 31 identify X- and Y-axis control circuits, 32 and 33 servo control circuits, 34 and 35 X- and Y-axis motors and 36 and 37 position sensors. An NC command program is read out by the tape reader 26 from the command tape 27, and stored in the RAM 23. Moreover, the contents of the NC command program are interpreted by the microprocessor 20 and required running information is prepared. A parameter for the jog feed is entered by the NC command program or from the keyboard 28 and stored in a parameter setting area of the RAM 23.

FIG. 9 is an example of a flowchart for implementing the acceleration/deceleration system of the present invention, showing acceleration/deceleration processing in the X-axis direction alone. Reference character A indicates processing concerning the automatic mode (running based on a command from the tape or memory) and B processing concerning the manual mode.

The microprocessor 20 executes steps S1 to S9 for each predetermined sampling time. That is, a velocity calculation A expressed by the following expression is conducted on the basis of a velocity command Fi as by a feed rate F of the command tape 27 and a set value OVRa of the override dial 29d, calculating the current velocity $\delta Fa$ (S1).

$$\delta Fa = Fi \times OVRa \qquad (1)$$

Next, the tangential component of the current velocity is subjected to linear or exponential type acceleration or deceleration processing A to compute an accelerated or decelerated command velocity $\delta Fa'$ (S2). Then a pulse distributing calculation A for a linear or circular-arc movement is conducted based on the accelerated or decelerated command velocity $\delta Fa'$ and a command on the amount of movement, obtaining an interpolation pulse Pa in the X-axis direction in the automatic mode (S3).

Next, a velocity calculation B expressed by the following expression is conducted on the basis of a command velocity Fm for the X-axis jog feed, given by a parameter, and a set value OVRb of the override dial 29c, computing the current velocity $\delta Fb$ of the X-axis jog feed (S4).

$$\delta Fb = Fm \times OVRb \qquad (2)$$

Next, a pulse distributing calculation B for the current velocity $\delta Fb$ is performed (S5), and the tangential component of the resulting interpolation pulse Pb is subjected to linear or exponential type acceleration or deceleration processing B, obtaining an interpolation pulse Pb accelerated or decelerated by the manual mode (S6).

Next, the interpolation pulse Pa by the automatic mode and the interpolation pulse Pb' by the manual mode are added together to obtain a composite distribution pulse $P_0$ (S7). Next, it is checked whether the sum $P_0$ exceeds an allowed maximum value MAX, and if not, the sum $P_0$ is provided. When the sum is in excess of the allowed limit, the maximum value MAX is provided and, at the same time, the exceeding signal is added to a so-called error in the acceleration/deceleration processing of step S6 (S8). Step S9 is to apply the output of step S8 to the X-axis control circuit 30.

As described above, according to the present invention, when a distribution pulse for a certain axis subjected to acceleration or deceleration processing prior to an interpolation, is superimposed on a distribution pulse for another axis, the latter is also subjected to independent acceleration or deceleration processing and then superimposed, so that a smooth acceleration or deceleration can be achieved. Furthermore, since the distribution pulses are separately subjected to the acceleration or deceleration processing, an acceleration or deceleration time constant and a deceleration curve of an optimum pattern can also be obtained for each of them. Besides, since clamp means is provided by which an output of a pulse frequency exceeding an allowed value, resulting from superimposition of a distribution pulse from a manual mode distributor on a distribution pulse from an automatic mode distributor, is clamped to the allowed value and the signal exceeding the allowed value is fed back to the side on which the distribution pulse is subjected to acceleration or deceleration processing, it is possible to prevent that a command exceeding an allowed maximum value is provided to the servo control circuit, and that the distribution pulses from the manual mode distributor are all applied to the servo control circuit.

What is claimed is:

1. An acceleration/deceleration system for a numerical controller, comprising:
    means for subjecting a tangential component of a distribution pulse for an axis to acceleration or deceleration processing prior to an interpolation;
    means for subjecting a command pulse to be superimposed to independent acceleration or deceleration processing and then superimposing the command pulse on the distribution pulse for the axis after the interpolation; and
    means for clamping the superimposed command pulse for output to a servo control circuit to an allowed value when the superimposed command pulse exceeds the allowed value, and for returning the portions of the superimposed command pulse exceeding the allowed value to said means for subjecting a command pulse to be superimposed to independent acceleration or deceleration processing.

2. An acceleration/deceleration method for a numerical controller, comprising the steps of:
   (a) subjecting a distribution pulse to acceleration/deceleration processing prior to interpolation;
   (b) interpolating the distribution pulse after said step (a);
   (c) subjecting a command pulse to independent acceleration/deceleration processing;
   (d) superimposing the command pulse on the interpolated distribution pulse after said steps (b) and (c); and
   (e) clamping the superimposed pulse to an allowed value when the superimposed pulse exceeds the allowed value.

3. A method as set forth in claim 2, further comprising the steps of providing the portion of the superimposed pulse exceeding the allowed value for processing in accordance with said step (c) and repeating said steps (a)–(e).

* * * * *